United States Patent [19]

Loveland

[11] 3,869,041
[45] Mar. 4, 1975

[54] MACHINE FOR SEED CELLING PREVIOUSLY CORED APPLES

[75] Inventor: Malcolm W. Loveland, Orinda, Calif.

[73] Assignee: Atlas Pacific Engineering Company, Emeryville, Calif.

[22] Filed: Nov. 21, 1973

[21] Appl. No.: 417,725

Related U.S. Application Data

[62] Division of Ser. No. 283,919, Aug. 25, 1972.

[52] U.S. Cl. .................. 198/259, 198/25, 198/131
[51] Int. Cl. ......................................... B65g 47/24
[58] Field of Search ............ 198/25, 103, 144, 131, 198/178, 245, 258, 259, 260; 209/109

[56] References Cited
UNITED STATES PATENTS

| | | | |
|---|---|---|---|
| 3,310,084 | 3/1967 | Anderson et al. | 198/258 |
| 3,586,151 | 6/1971 | Loveland | 198/258 |
| 3,602,281 | 8/1971 | Anderson et al. | 198/259 |

Primary Examiner—Richard A. Schacher
Assistant Examiner—Richard K. Thomson

[57] ABSTRACT

Apples which have been peeled and cored as with the machine shown in U.S. Pat. No. 3,586,081 are discharged to an inspection station where they are inspected and any trimming required is done by hand. The apples selected for slicing are then sent on in bulk to the machine of the present invention wherein they are oriented, utilizing the cored hole in the apple, following which they are transferred from the orienting mechanism, taking advantage of the alignment provided by the cored hole. After the transfer they are moved to a station where they are cut to remove the fibrous carpel material surrounding the seeds together with the seeds. Following this operation, the apples are cut into segments as desired.

5 Claims, 36 Drawing Figures

PATENTED MAR 4 1975   3,869,041

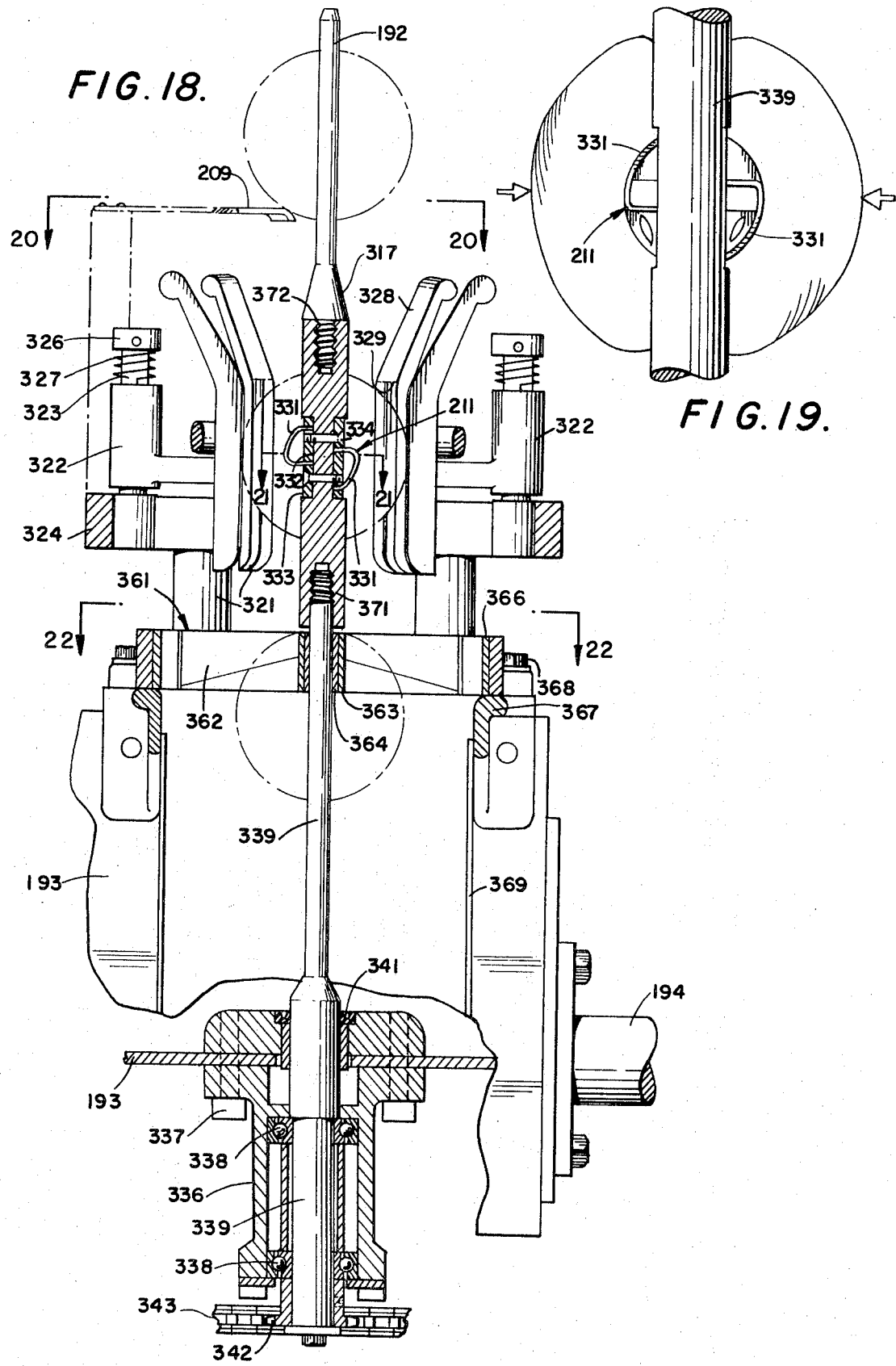

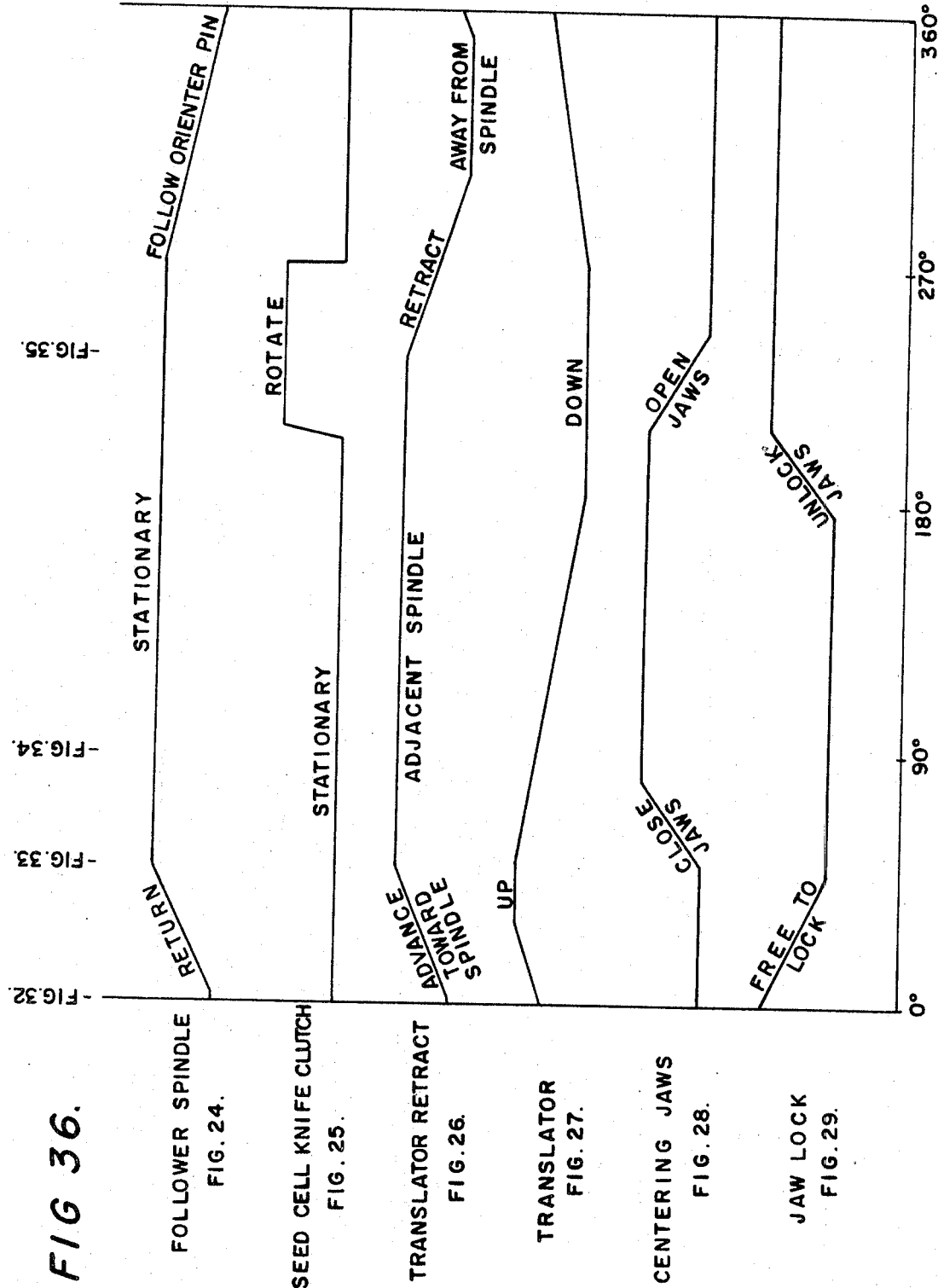

MACHINE FOR SEED CELLING PREVIOUSLY CORED APPLES

This is a division of application Ser. No. 283,919 filed Aug. 25, 1972.

BACKGROUND OF THE INVENTION

In the past, apples have been peeled and cored. If it was subsequently desired to remove the seed cell, this was done on a separate machine, the apples being picked out by hand and fed to a simple seed celling machine one at a time.

SUMMARY OF THE INVENTION

The machine of the present invention permits the inspection and trimming of the whole peeled apple prior to seed celling and slicing. Thereafter a generally spherical cavity is cut to remove the fibrous carpel material surrounding the seeds together with the seeds. Thereafter the apple is cut into segments.

It is in general the broad object of the present invention to provide an improved machine for receiving peeled and cored apples in bulk for orientation. The oriented apples are then fed to a device in which a spherical cavity is cut to remove the fibrous carpel material surrounding the seeds together with the seeds.

A further object of the present invention is to provide a cup-wheel and finger-type orientor having a plurality of cups extending horizontally across the machine and moving in parallel rows past a series of fingers which serve to move each apple into varying engagement with the rotating wheel.

A further object of the present invention is to provide a transfer unit which accepts or rejects an apple depending upon whether the core hole has been found by the transfer device.

An additional object of the present invention is to provide a seed celling unit in which the cored apple slides down a spindle into position for the subsequent removal of the fibrous carpel material and the seeds in such material.

The following brief description will serve to set forth further features of the machine of the present invention.

Apples which have passed inspection and are of an acceptable quality are fed in bulk to a mechanism in which the apples are placed in single file in several parallel rows and are then fed to an orientor. The single filing and single feeding portion of the machine is largely conventional and one can refer to the U.S. Pat. No. 3 439 791 for such a mechanism. The next portion of the machine is the orientor in which several cups are provided in bars which extend transversely across the machine. Associated with each cup is a wheel while a series of depending fingers serve to move an apple into engagement with a wheel to orient the cored apple so that the core hole extends vertically. After the apple is oriented, it is passed to a transfer unit which includes pins of relatively small diameter which rise up through the hole in the bottom of the cup and threads into the core hole. These pins are relatively small, usually of the order of ⅜ inch in diameter. The pins are provided with a bullet nose end which facilitates entry of the pin into the core hole. If the core hole has not been positioned so that the pin can enter, then the apple is lifted and pushed to one side or the other by the pin to roll freely into a reject chute for recycling.

Those apples which are threaded on the pins are held on the pins by curved plates as the conveyor carrying the orientor bars passes about the end sprockets supporting the conveyor. The curved plates continue down to within about 30° of the lowest most point of rotation of the sprockets. At this point the pin carrying the apple comes into alignment with a small diameter pin which is an elongation of the spindle with which seed celling will be achieved. As soon as both pins are substantially in alignment, the seed celling pin follows the motion of the first mentioned pin for about an inch and a half of its motion. During this following motion, the apple clears the end of the curved support plate and falls onto the seed celling pin where it is checked by a leaf spring stop at a point which will clear the next incoming apple. As soon as the apple leaves the first mentioned pin, the seed celling spindle retracts to its original position and waits to begin to track the next threading pin and apple.

During this dwell, the seed celling operation begins. As soon as the spindle is in its retracted position, a set of centering jaws moves into place above and below the apple resting on the leaf spring stop. The jaws are spring biased toward each other and close on the apple, centering the apple between them. The jaws are locked in this position until the apple moves to the seed cell cutting position. As the jaws close, they also move axially along the spindle carrying the apple past the leaf spring stop. The spindle is tapered to full core hole size and has one or more seed cell shaped knives protruding radially therefrom. These knives are positioned on the spindle to be centered on the length of an apple when the jaws stop at the end of their down stroke.

As the apple approaches the seed cell cutting position, the apple is encompassed by a set of spring loaded arms which swing to allow the apple to enter and which press inwardly to resist the tendency for the apple to break as the seed cell knife rotates within it. These arms also have small axial protrusions on their inner faces to grip the outside of the apple and so resist the torque of cutting the seed cell. During the transfer of the apple into position for cutting the seed cell, the spindle carrying the seed cell knives has been stationary. Once the apple is in position, the spindle rotates at least one full turn to cut the seed cell free.

In the preferred form of a seed cell knife. I provide two loops arranged 180° apart on the spindle. One knife cuts the upper third of the generally spherical cavity and the other knife cuts the lower third. This effectively divides the cell material into three segments which, upon being cut by the slicing knives, become comparatively small units, easily separated from the slices. A further advantage is the reduction in the tendency of the apple to burst during cutting of the seed cell.

With the apple centered on the seed cell knives, the centering jaws open to clear the largest apple and retract from the spindle to clear a large apple in the seed cell position as the jaws move upward to engage the next incoming apple. This motion places a fixed finger above the apple undergoing seed celling so that, as the centering jaws move the next apple into position for seed celling, the previously seed celled apple is moved onward. The apple is moved through a slicing grid which preferably includes a number of knives radiating outwardly from a seed celling spindle so as to produce orange segment-like slices, although one can use two opposite knives to cut the apple in half.

Some of the features of advantage in the above are as follows:

1. The pin threading system of accepting oriented or rejecting unoriented apples.

2. The transfer of apples to the celling spindle extension as it follows the threading pin briefly. This following is important to gain time for the apple to fall sufficiently to engage the extended spindle. Without the following action, the speed would be drastically limited, say, 30 or 40 apples per minute instead of 100 or more per spindle.

3. The centering of the apple on the seed cell knife has not been achieved except in an elementary way in U.S. Pat. No. 2,808,869 to Ganze. All slicers heretofore partially impaled the apple on the slicing knives to absorb the torque of seed celling. This prevented any reference to the bottom of the apple to determine where the center of the apple was located. Ganze used a spring over travel pusher arm and the penetration of the knives into the apple. As long as the apple size and consistency remained constant, the Ganze device would be successful. By seed celling out of contact with the slicing knives, I am able to center the apple properly for I can refer to both the top and the bottom of the apple.

4. A further advantage is that in the prior art devices, the apple entering the celling station had to push the previous apple about half way through the slicing knives. This resulted in shattering many apples.

BRIEF DESCRIPTION OF THE DRAWINGS

FIG. 18 is a section taken along the line 18—18 in FIG. 11.

FIG. 19 is an enlarged view in which the arrows on opposite sides of the apple indicate the gripping force supplied by the gripping jaws with the seed cell knives cutting the carpel tissue and seeds from the apple.

FIG. 36 is a timing chart showing the relative timing of several of the operations involved.

DESCRIPTION OF THE PREFERRED EMBODIMENT

Figure 1:
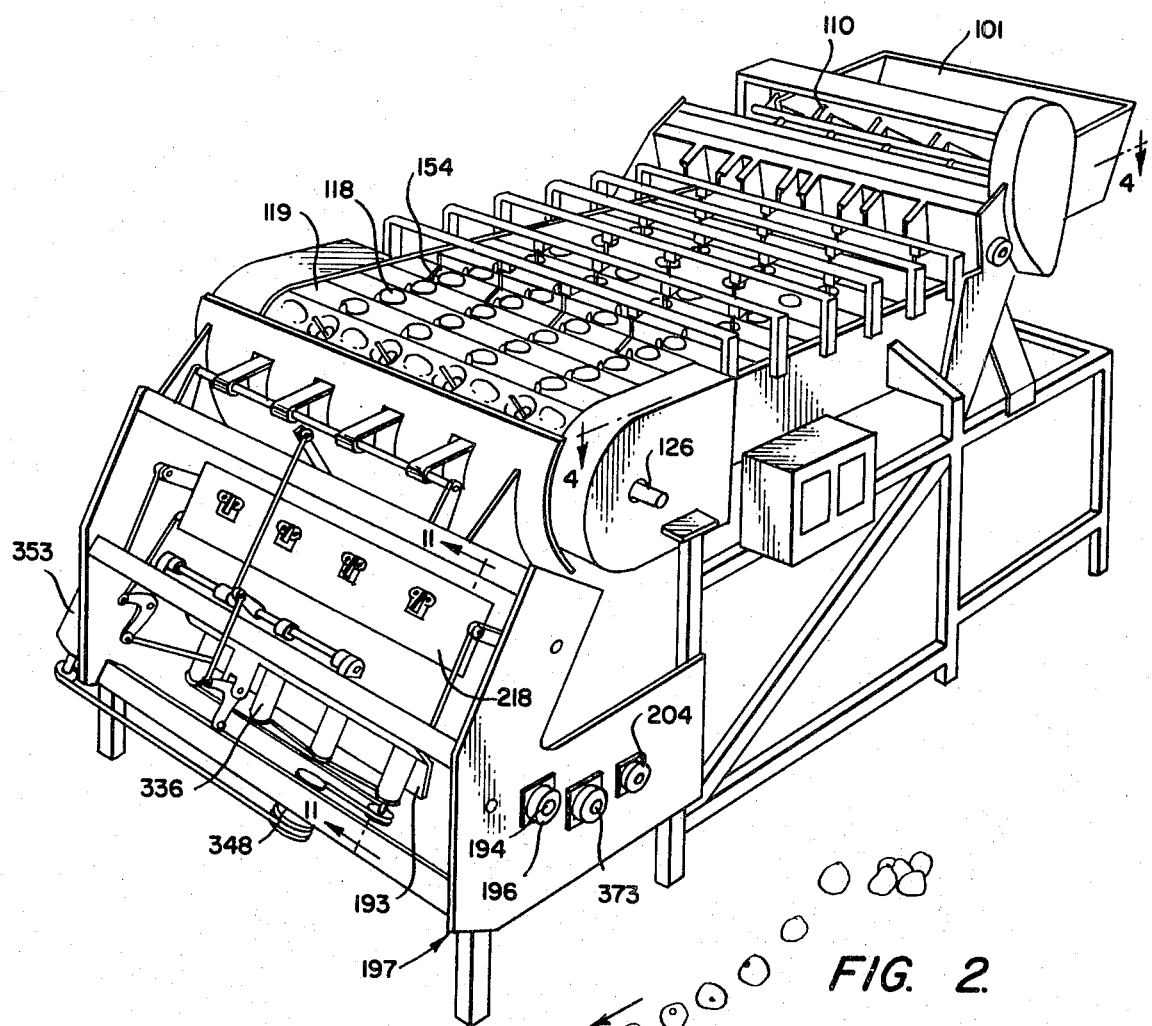
FIG. 1 is a perspective view of the complete machine providing the present invention.
Figure 2:
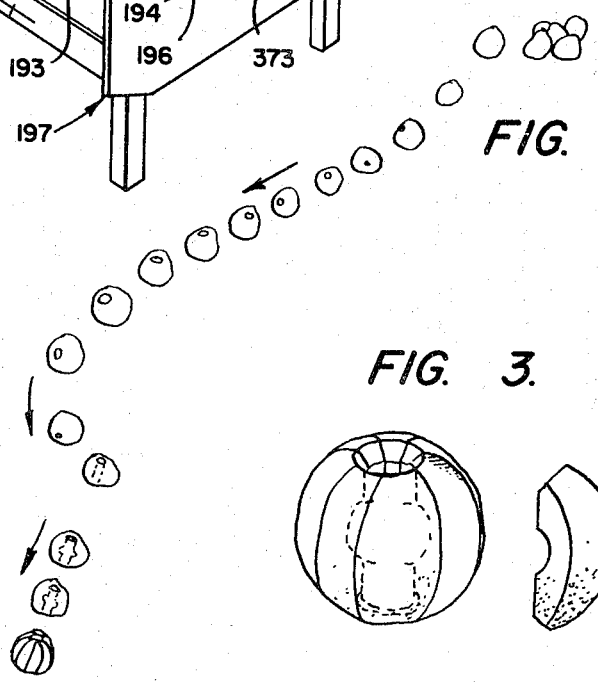
FIG. 2 is a diagram illustrating the path of travel of an apple through the machine.
Figure 3:
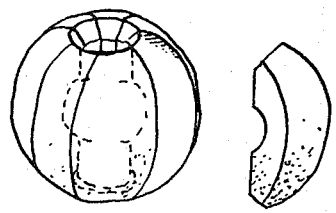
FIG. 3 is a perspective view of an apple showing how it appears after the seed cell has been removed and it has passed through the slicing device to cut the apple into orange segment-like sections.

Referring to the drawings and particularly to FIGS. 1, 4, 5 and 30, apples which have been previously peeled, cored and inspected are delivered into a pan 101. The pan is mounted upon a frame 102 which is supported upon opposite links 103 and 104 which in turn are mounted upon a sub-frame 106. Eccentrics 107 are mounted upon opposite ends of a drive shaft 108 and rod 111 extends rearwardly from each to engage frame 102. The rotation of shaft 108 is effective to rock frame 102 and pan 101 back and forth.

Figure 4:
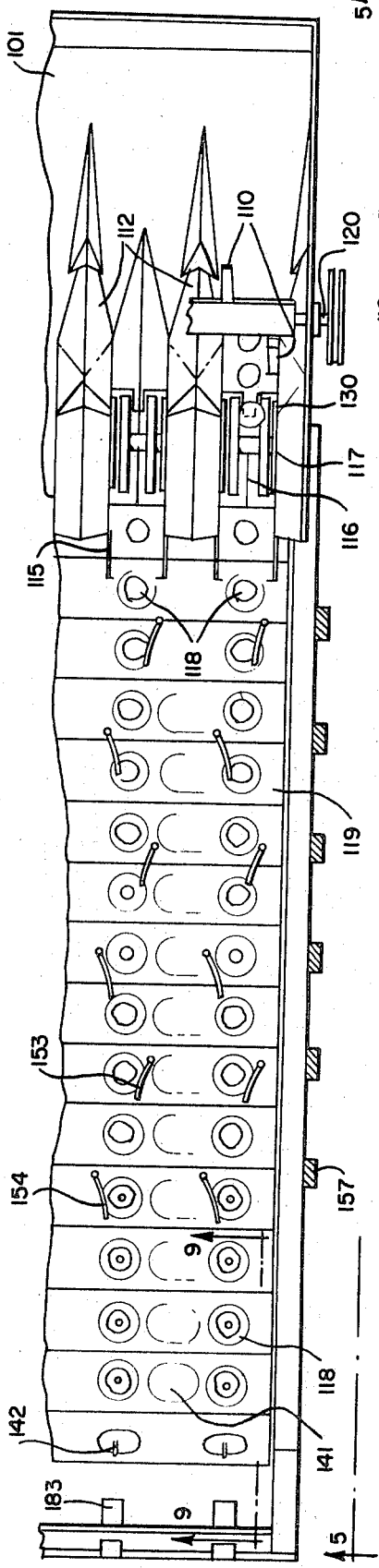
FIG. 4 is a plan view of that portion of the machine in which the apples are taken from bulk and placed in several rows in each of which the apples are in single file for orientation.
Figure 5:
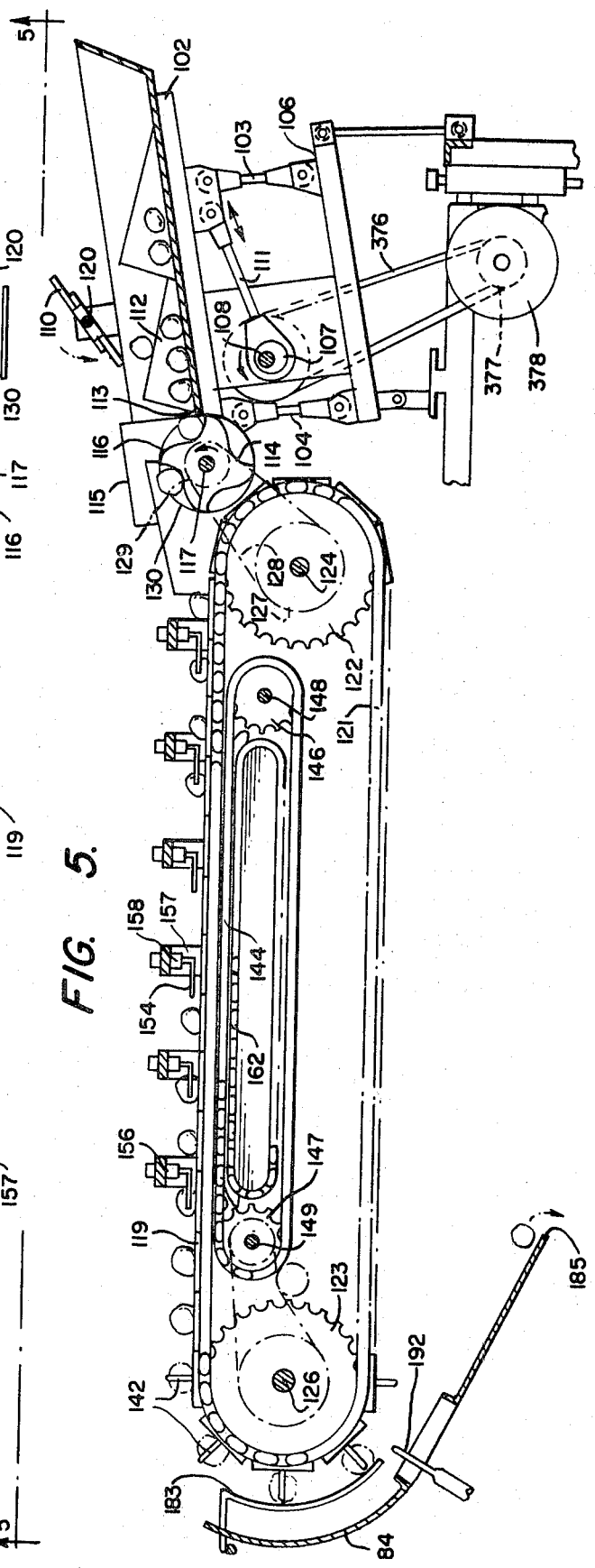
FIG. 5 is a section taken along the line 5—5 in FIG. 4.

The pan 101 generally slopes downwardly from right to left in FIG. 5 and at its lower end I provide a plurality of V-shaped projections 112 (FIG. 4). Apples ride between the V-shaped projections and so are urged into single file. Rubber paddles 110 are counterrotated by shaft 120 above the V-shaped projections 112 to prevent apples from passing through except one at a time. As the apples fall off the end 113 of each pair of the V-shaped projections, they are guided by a chute 115 to fall into one of the pockets 114 provided in a turret wheel 116 which is rotated by shaft 117. Circular plates 130 are provided on each side of each turret wheel to confine an apple to a pocket in the wheel. Shaft 117 is rotated by a drive from shaft 124, the latter having a sprocket 127 thereon with a chain 128 extending about it and over a sprocket 129 on shaft 117.

Figure 6:
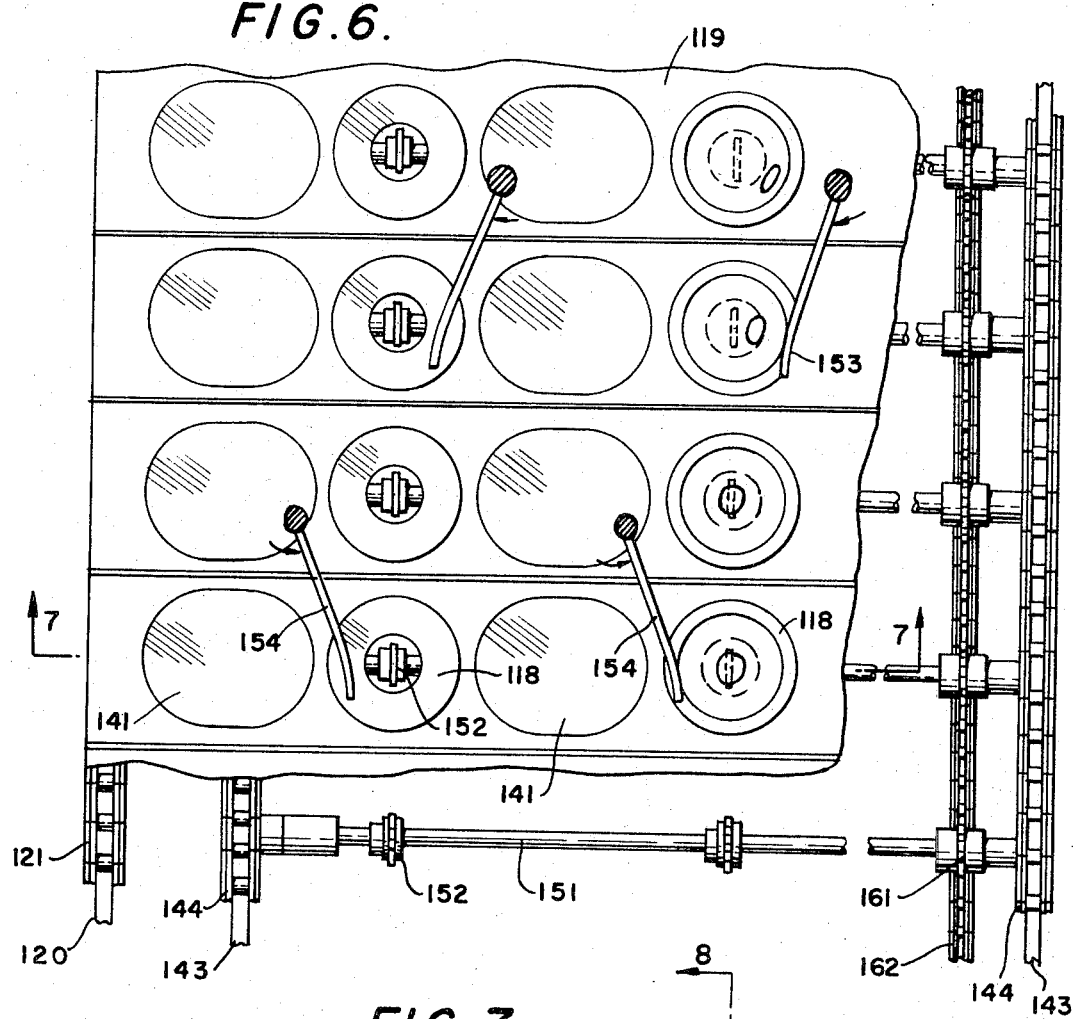
FIG. 6 is an enlarged view showing a portion of the orienting mechanism and its drive.

Each of the wheels 116 is aligned with one of the series of cups 118 provided in the transverse bars 119. In the machine shown, four cups are provided. The bars 119 are mounted upon opposite conveyor chains 121 which are trained about sprockets 122 and 123 provided in pairs at opposite ends of the machine, the sprockets being respectively mounted upon shafts 124 and 126. The chains 121 ride along rails 120 which extend between the sprockets 122 and 123 (FIG. 6).

Figure 10:
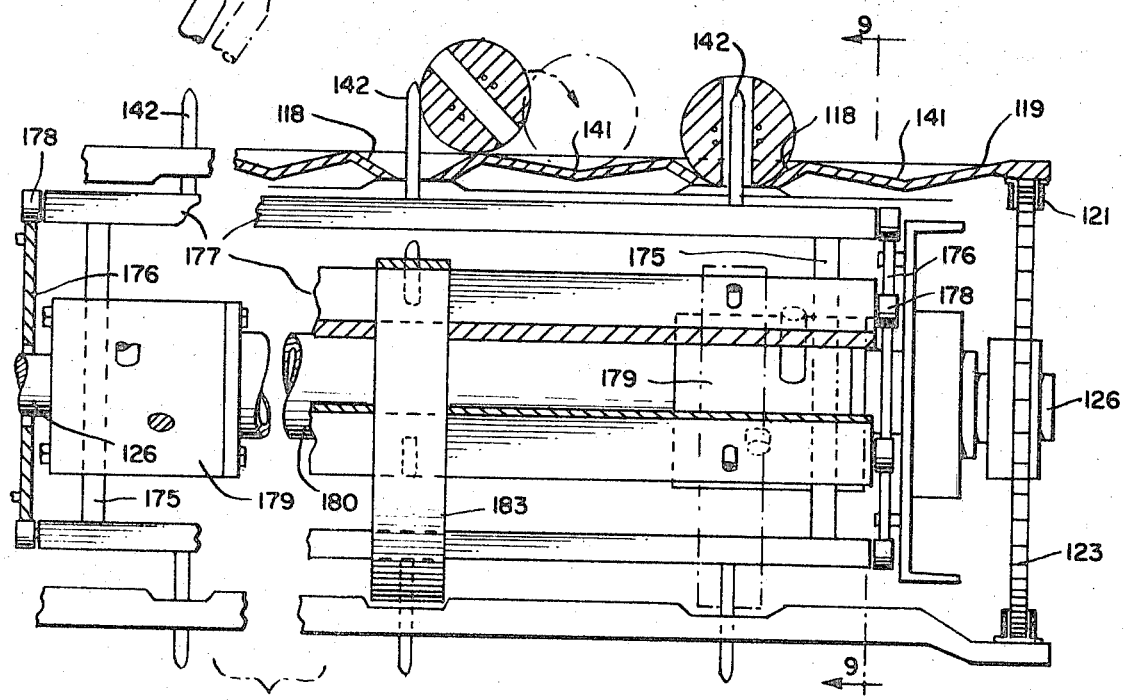
FIG. 10 is a partial front elevation showing the action of the pin and the dislodging of an apple which has not been threaded by the pin.

The cups 118 are separated from one another by recesses 141 which act as a dwell area to receive an apple which is not oriented and so is not engaged by one of the centering pins 142. This action is clearly shown in FIG. 10 wherein the righthand apple has been engaged by a pin 142 while the lefthand apple has been pushed to one side by the pin into the dwell area to pass to a reject chute.

Figure 7:
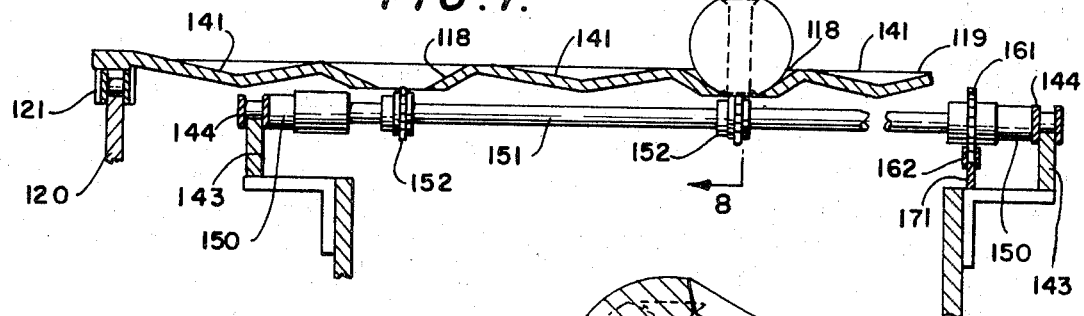
FIG. 7 is a section taken along the line 7—7 in FIG. 6.
Figure 8:
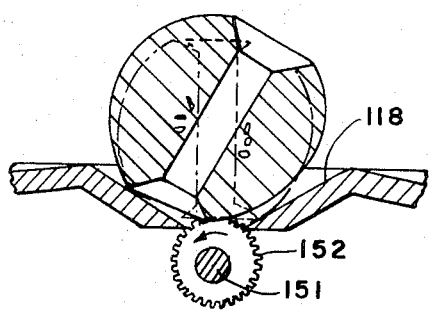
FIG. 8 is a section taken through the line 8—8 in FIG. 7 showing an apple undergoing orientation.

Referring to FIGS. 5 and 7, orientation of the apple is effected by the following mechanism. Tracks 143 are provided on opposite sides of the machine to support opposite chains 144 which are trained about sprockets 146 and 147 provided at opposite ends of the machine upon shafts 148 and 149. Extended at spaced intervals between the chains 144 and mounted thereon by bearings 150 are orienting shafts 151. Each shaft is positioned beneath a bar 119 and each carries several eccentric, knurled wheels 152 which rotate in the center of the opening in each of the conical cups 118 to turn the fruit until the core hole is over the wheel as is shown in FIGS. 7 and 8. In this condition, the wheels 152 lose contact with the apple and the apple is oriented with the core hole over the wheel. The shafts 151 are rotated by providing a sprocket 161 near an end of each shaft. A length of chain 162 extends along horizontal support 171 and serves to rotate each sprocket 161 as the shafts 151 are moved along by chains 144.

To assist in the orientation, I provide a plurality of fingers 153 and 154. These are so positioned that they will brush against and disturb an unoriented apple in the conical cup and assist it into a different engagement with the knurled wheel. Each finger is supported from a crossbar 156 supported across the frame of the machine and over the upper conveyor by supports 157. Each finger is mounted in a bearing support 158 which includes a torsion spring, not shown, but which serves to bias the associated finger into engagement with an apple and to resist movement of the finger by the apple. The spring has a strength such that it will not disorient an oriented apple.

As the apples approach the discharge end of the conveyor, the orienting wheels are withdrawn from the opening in the cup by the passage of the wheel carrying chains 144 around the sprockets 147. At this point, the apples are either oriented or unoriented. As the cups pass around the sprockets 123, pins 142 rise up through the central hole in the cups 118 and thread into the apple core hole. If the apple is not oriented, the apple will be pushed aside and will carry around the conveyor and into chute 184 which diverts them out of the machine over the end 185 of chute 184.

Figure 9:
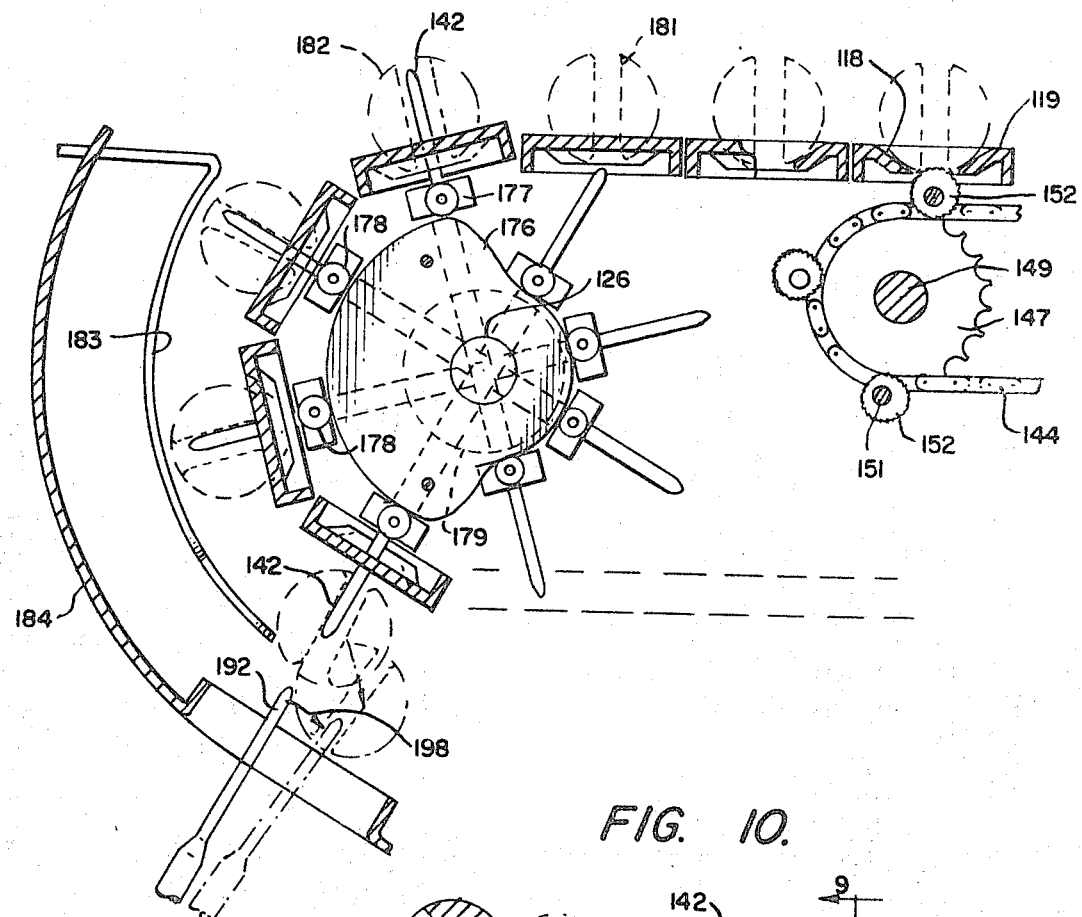
FIG. 9 is a partial side elevation taken along the line 9—9 in FIG. 10 and illustrating the pickup of an apple from the orienting conveyor with the core hole in the apple aligned with the transfer spindle and the subsequent transfer of the apple to the spindle upon which the apple slides into position for subsequent removal of the seed cell.

The movement of the pins 142 is effected by cams 176 affixed on each side of the machine (FIG. 9). Each of pins 142 is mounted on bars 177 which extends across the machine. Each bar has a roller 178 at each end riding on the surface of each of the cams 176. A support 179 is carried on each stub shaft 126 and rotates with that shaft. The two tubular supports 179 are joined by tube 180. Affixed about the periphery of the tubular supports are a plurality of slide pins 175 which are affixed to each of the tubular supports 179. The tubular supports provide for the sliding movement on pins 175 of each of the bars 177 and their pins 142 to the various positions as appears in FIG. 9. Thus, as the tubular supports 179 are rotated, the rollers 178 on each bar 177 ride over the cams 176, first bringing the pins 142 into an angular position in relation to the core hole of an apple as indicated at 181 (FIG. 9). As shafts 126 continue to rotate, the pin is raised further until it is projected more than half way into the core hole as it appears in position 182. As rotation of the tubular supports continues and the apples drop below the vertical position, the apples come into engagement with a curved plate 183 which retains the apple in position on the pin 142 until the apple reaches the end of the curved plate 183.

Curved plate 183 terminates at a point about 30° from the vertical. In alignment with each of the pins 142 at this point are a series of spindle assemblies 191 each including a spindle pin 192. Each spindle assembly corresponds to the path of each of the series of cups of the conveyor.

At the end of the circular plate 183 the apple is free to fall from pin 142 onto spindle pin 192 forming the upper end of spindle assembly 191. Pin 192 is a smaller diameter than the cored hole and has a bullet-shaped end to facilitate entry into the core hole of the apple. During this transfer, pin 192 follows the motion of pin 142 and remains in alignment with pin 142 a sufficient time for transfer of the apple to take place. This is accomplished by rocking each spindle assembly 191 back and forth in timed relation with the advance of the pins 142.

Figure 23:
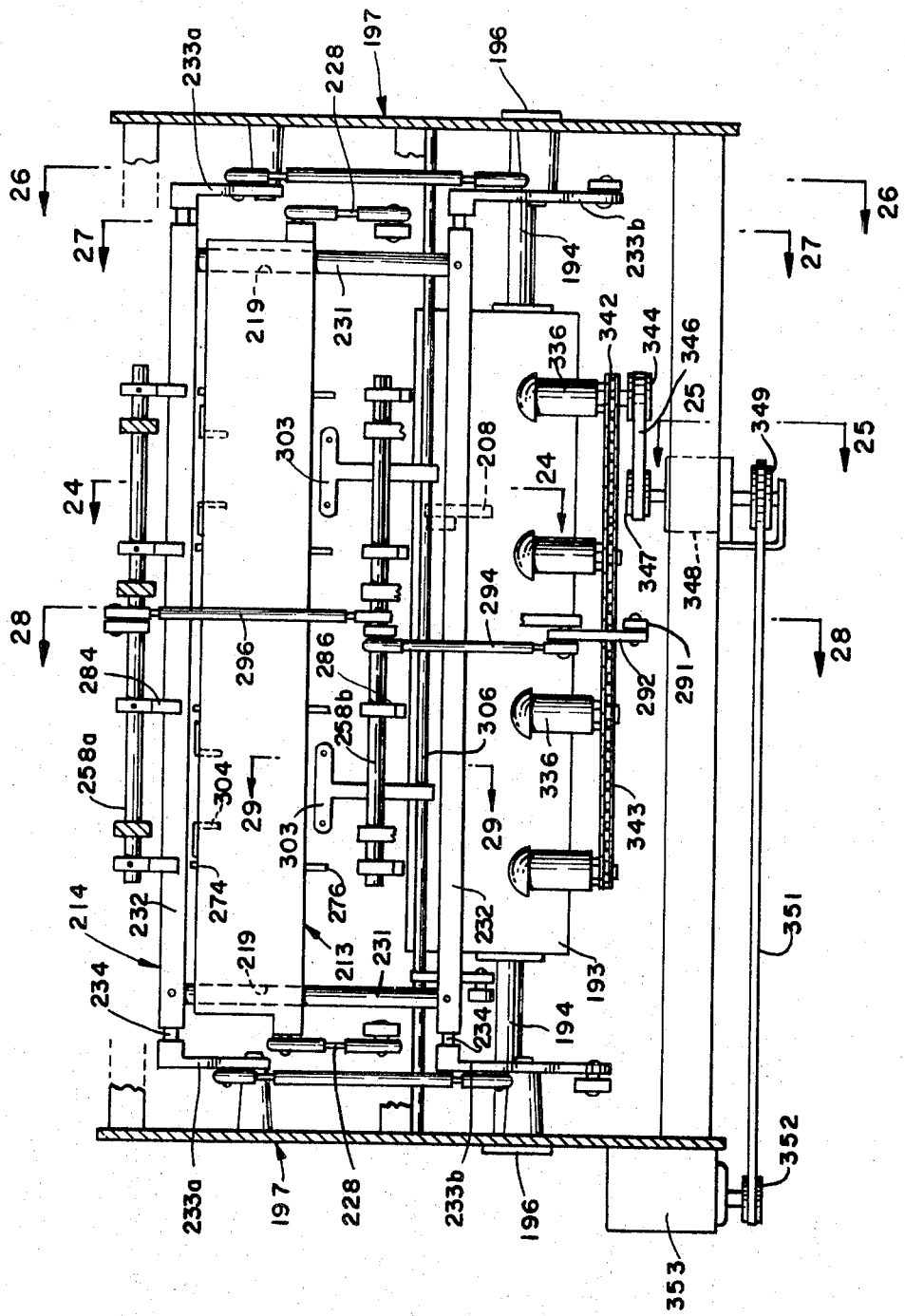
FIG. 23 is a section taken along the line 23—23 in FIG. 11.

The several spindle assemblies 191 are carried on a Z-shaped plate 193 which extends transversely across the machine and has shafts 194 at its outer ends (FIG. 23). Shafts 194 are carried in bearings 196 on main frame 197. The Z-shaped plate and the associated spindle assemblies 191 are rocked back and forth on bearings 196 so that each spindle pin 192 follows a pin 142 in the direction of arrow 198 and then retracts as is shown in FIG. 11.

Figure 24:
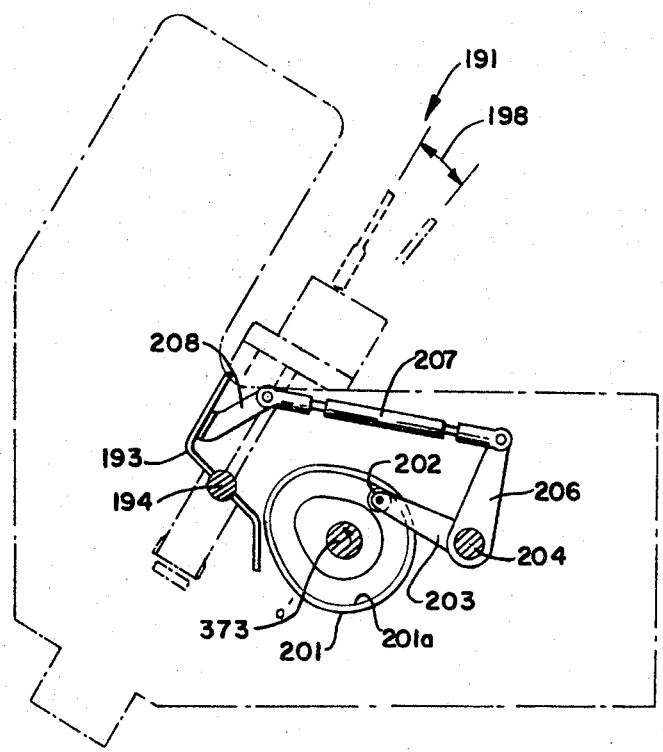
FIG. 24 is a side elevation showing the spindle oscillating.

The Z-shaped plate 193 is rocked by cam 201 mounted on cam shaft 373 (see FIG. 24) as indicated in the cam timing chart of FIG. 36 by line "follower" spindle. Cam follower 202 carried on arm 203 engages cam track 201a of cam 201 and moves arm 203 attached to rocker shaft 204. Another arm 206 is attached to shaft 204 and pivotally carries adjustable link 207 at its outer end. Link 207 is pivoted to bracket 208 carried on plate 193 and moves the plate back and forth about shaft 194.

Figure 11:
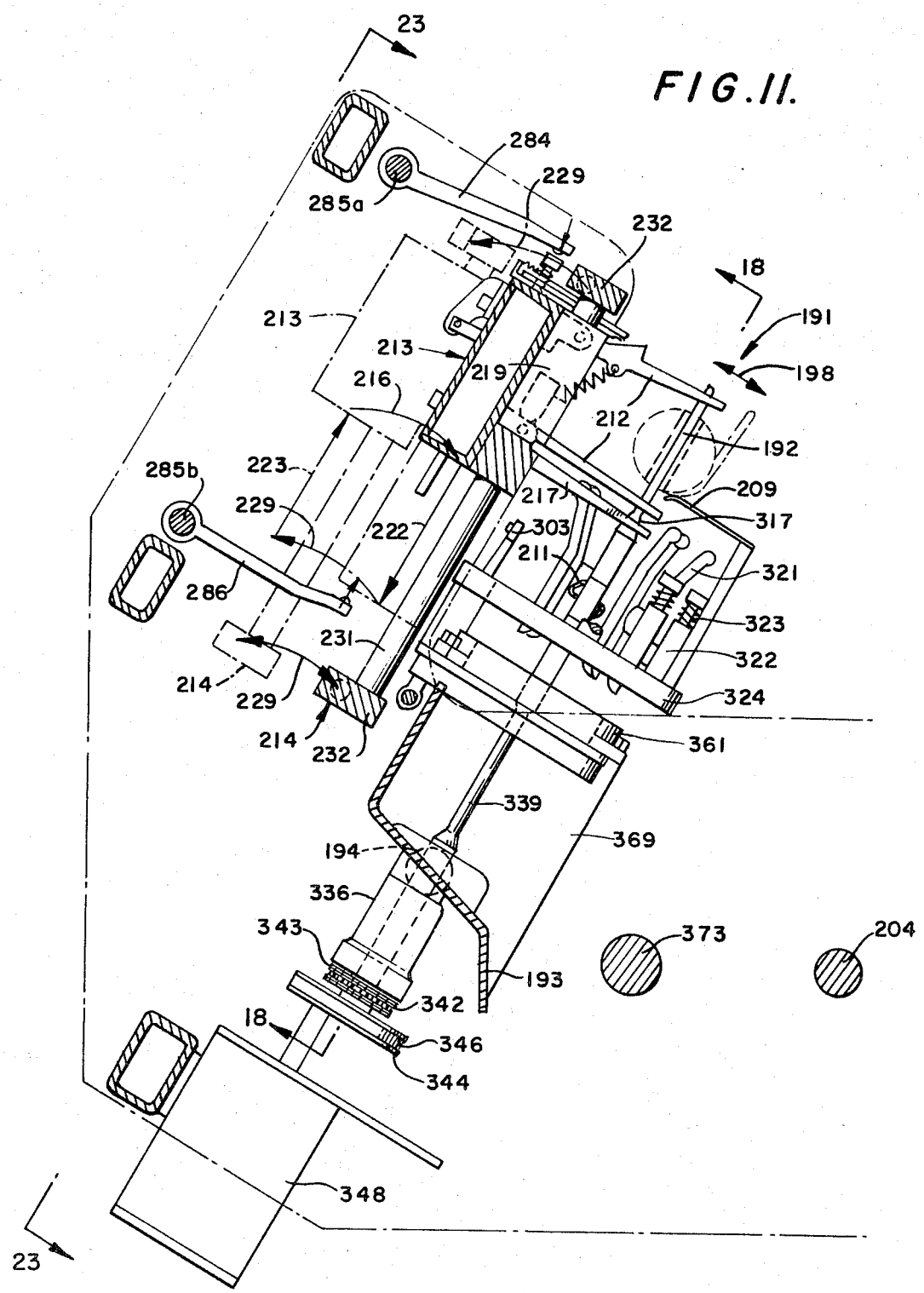
FIG. 11 is a side elevation taken through the mechanism for raising and lowering the jaws and oscillating the spindle on which the apple is subsequently cut to remove the seed cell.

As the apple falls free onto spindle 192, the bottom of the apple engages leaf spring 209 and is stopped thereby (FIG. 11). As mentioned, further down the spindle assembly each apple will have its seeds and surrounding fibrous carpel material removed by seed celling knives 211. The seed cell is generally in the center of the apple and provision is made to locate and hold the center location of the apple while it is moved into the seed celling station on the spindle assembly.

As shown in FIGS. 11 and 23, a set of centering jaws 212 are carried adjacent each spindle assembly on a translator carriage 213. Carriage 213 extends transversely across the machine and is vertically movable along parallel ways 214. Parallel ways 214 are in turn movable toward and away from the spindle assemblies 191.

As spindle pin 192 retracts from following pin 142, as shown in solid line in FIG. 11, the transistor carriage 213 is moved in the direction of arrow 216 (FIG. 11) to bring the centering jaws into position above and below an apple held on the spindle pin 192 in engagement with leaf spring 209. A fixed finger 317 is also carried on carriage 213 and is brought into position over the previous apple at the seed celling station.

Translator carriage 213 is formed of a closed channel member 218 having bearings 219 at its outer ends (FIGS. 11 and 23). Bearings 219 are slidable along shafts 231 provided between parallel bars 232 in the frame 214. After the centering jaws have closed on the apple, the carriage is moved downward, as shown by arrow 222, to move the apple into the seed celling station while the previously celled apple is displaced from the station by fixed finger 217. Subsequently, the carriage 213 is retracted from the spindle assembly along path 229 and moves upward in the direction of arrow 223 for the next cycle.

Figure 27:
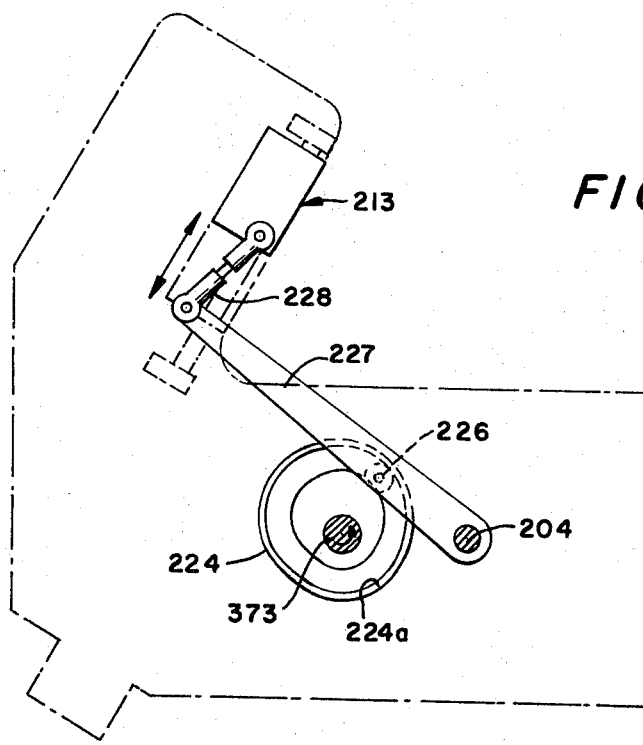

The translator carriage 213 is moved by a pair of cams 224 mounted on shaft 373 in a timed sequence as delineated by "translator" in FIG. 36. As shown in FIGS. 23 and 27, cam followers 226 are carried by arms 227 in cam tracks 224a to move arms 227 about their bearings on shaft 204. Links 228 are pivotally carried between the ends of arms 227 and the ends of channel members 218 in the carriage 213. To move the translator carriage 213 toward and away from the spindle assemblies 191, parallel bars 232 are moved from the solid line position of FIG. 11 to the phantom line position defined by arrows 229.

Figure 26:
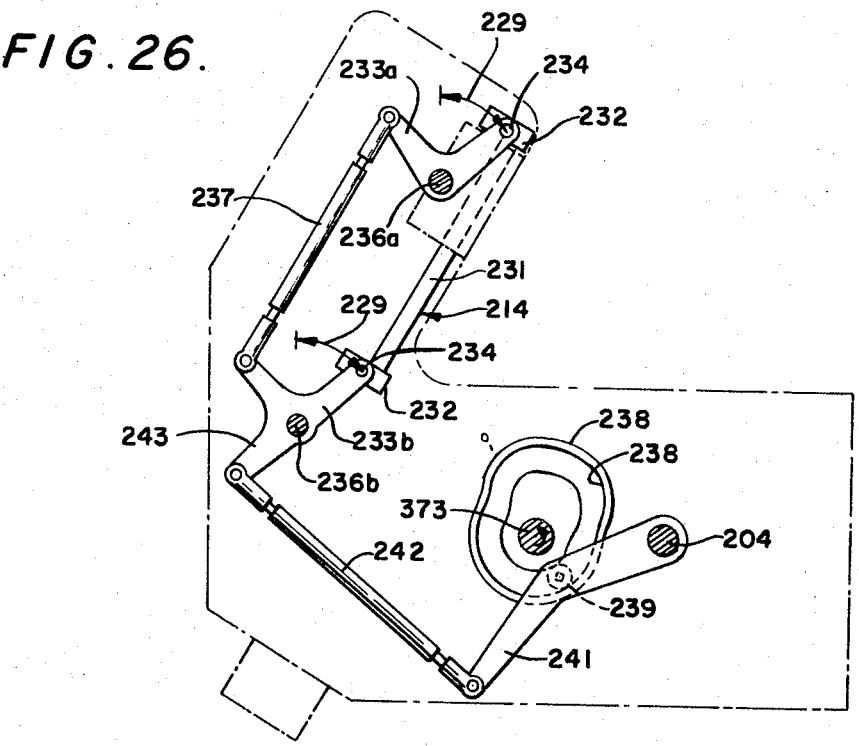

The frame 214 is formed by vertical shafts 231 supported at their ends on bars 232. Bars 232 extend across the machine to tie shafts 231 together and are supported at their ends on bell cranks 233a and 233b by pins 234 (see FIG. 26). The bell cranks are pivoted on stub shafts 236a and 236b and are tied together by links 237 to move the shafts 231 in parallel relation with the spindle pins 192. The bars are moved in the direction of arrows 229 by cams 238 mounted on shaft 373 in a timed sequence delineated along "translator retract" in FIG. 36. Cam followers 239 are carried by arms 241 in cam tracks 238a and swing arms 241 about their bearings on shaft 204 (FIG. 26). Arms 241 are pivoted to links 242 which are pivoted to arms 243 of bell crank 233b.

The centering jaws 212 (see FIGS. 12 to 17) are formed by upper and lower movable fingers 246 and 247 which are pivotally carried on pins 248 in support brackets 249 and 251. Brackets 249 and 251 are fastened to channel member 213 by bolts 252 with the lower bracket 251 also carrying fixed finger 217. The fingers are crescent shaped at their outer ends which fit around the spindle shaft and push against the ends of the apple.

Figure 12:
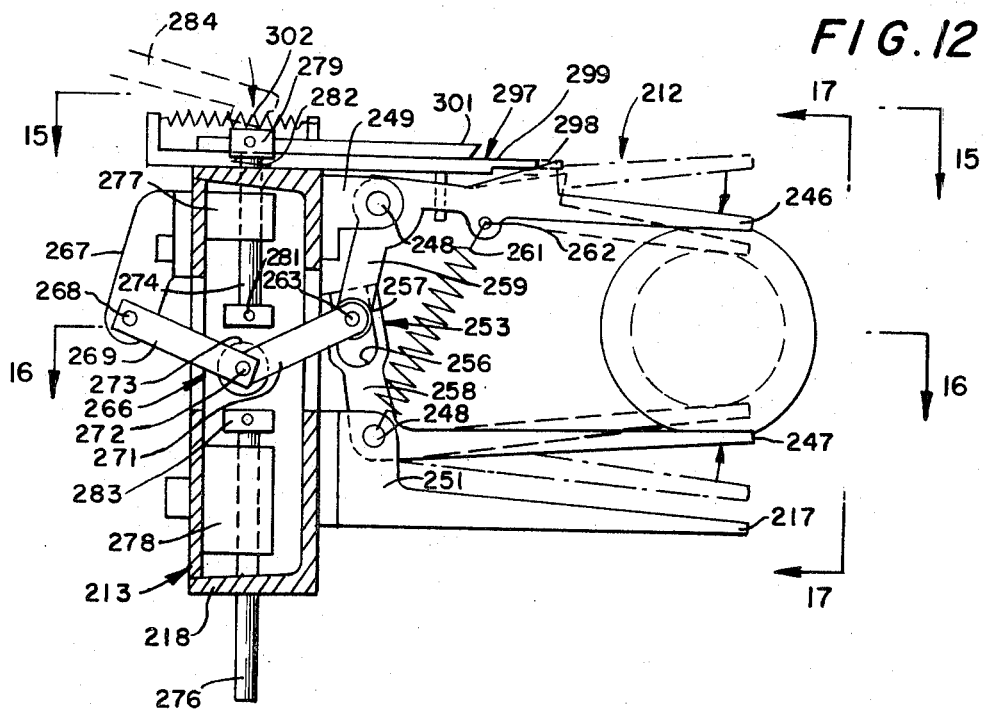
FIG. 12 is a sectional view showing the mechanism for the movement of the jaws to grip the apple.
Figure 13:
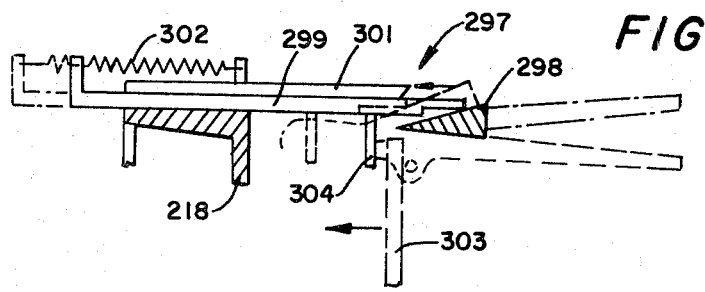
FIG. 13 is a side elevational portion of the mechanism for locking one of the gripping arms.
Figure 14:
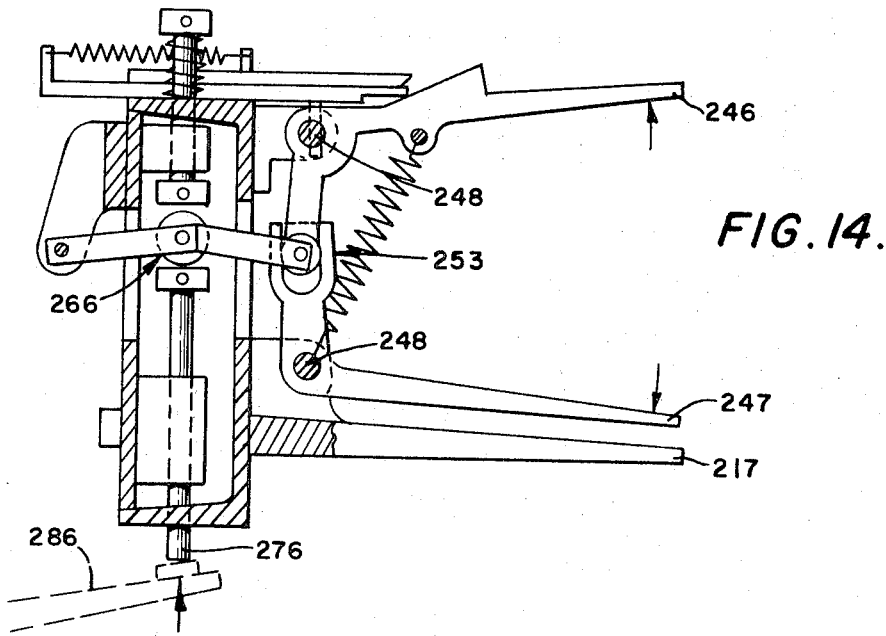
FIG. 14 is a view similar to FIG. 12 but with the arms in open position.
Figure 15:
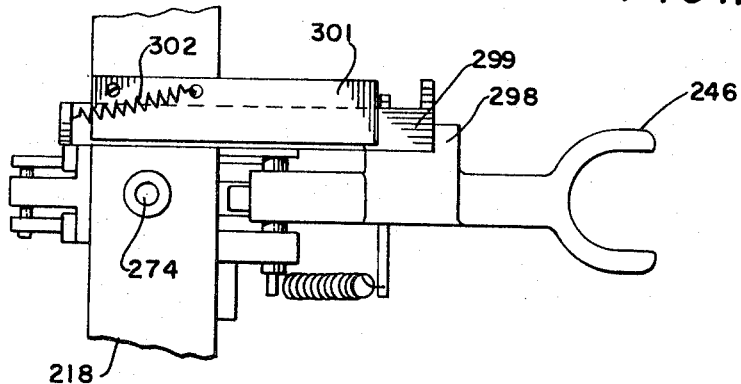
FIGS. 15, 16 and 17 are, respectively, views taken along the lines 15—15, 16—16 and 17—17 in FIG. 12.
Figure 16:
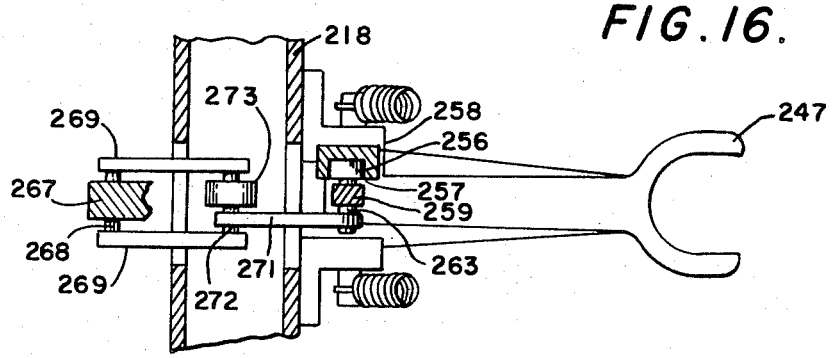
Figure 17:
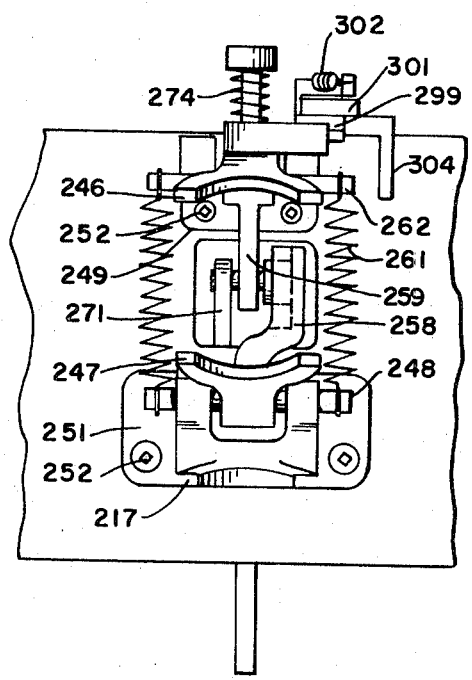
Figure 28:
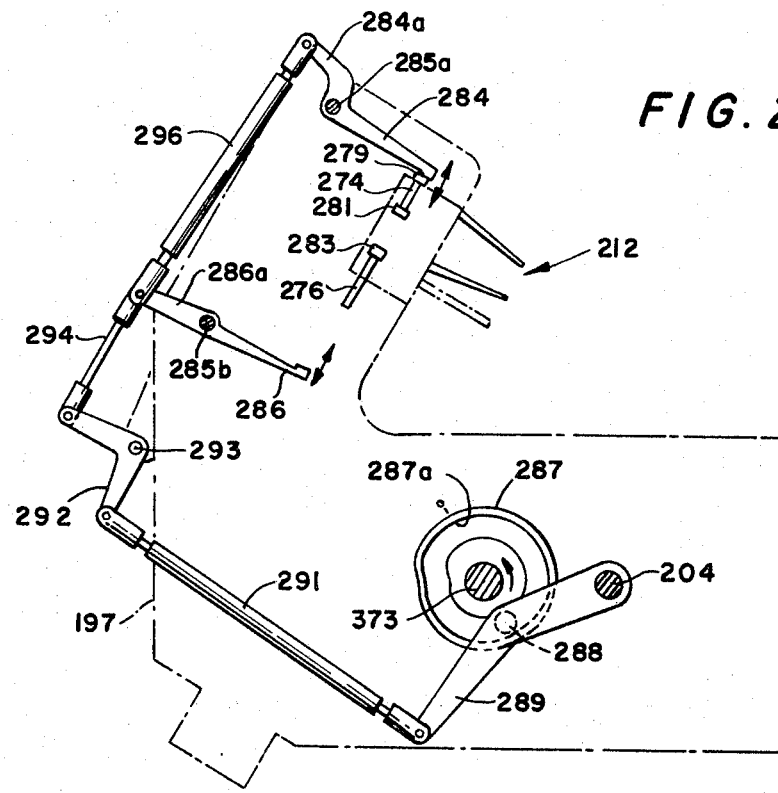

The upper and lower fingers 246 and 247 are tied together at their inner ends by an equalizing link 253 (FIG. 14). This ensures that the centering jaws open equidistantly about their median plane so that when they close on an apple, the horizontal mid-plane of the apple is also located and is confined in this median plane. This equalizing link is formed by slot 256 and roller 257 (FIG. 12) carried on crank arms 258 and 259 respectively of lower finger 247 and upper finger 246. Roller 257 is carried in slot 256 on pin 263. The movable fingers 246 and 247 are biased toward one another by spring 261 extended between lower pin 248 and pin 262 carried on upper finger 246. A toggle linkage 266 acts through equalizing link 253 to open the centering jaws and to hold them open during the retracting of the translator carriage. Toggle linkage 266 is pivotally carried on carriage 213 by support 267 through pin 268 and includes link 269 having one end pivoted to the support 267 and its other end pivoted to link 271 by pin 272. Link 271 has its outer end attached to the equalizing link through pin 263. A roller 273 is carried on pin 272 between the links 269 and 271 so that by shifting the roller over-center, as shown in FIG. 12, the centering jaws will be able to close under the bias of spring 261 around various sizes of apples and, by shifting the roller over-center in the upward direction of FIG. 14, the centering jaws will be locked fully open. This shifting of the toggle link is accomplished by vertically aligned shafts 274 and 276 carried in bearings 277 and 278 in channel member 218 above and below the roller 273 (FIG. 12). The upper shifting shaft 274 has end caps 279 and 281 at each end. The shaft 274 is biased upwardly by a light spring 282. The lower shifting shaft 276 has an end cap 283 at its upper end. The shifting shafts are displaced against toggle roller 273 by shifting arms 284 and 286 when the translator carriage is at its upper and lower stations adjacent spindle assembly 191. Shifting arm 284 acts on shaft 274 in the up position shown in FIG. 12 to close the jaws around an apple at the transfer station. Shifting arm 286 acts on shaft 276 to open the jaws at the seed celling station. The shifting arms 284 and 286 are carried on rocker shafts 285a and 285b respectively and both are moved by cam 287 (see FIG. 28) as defined in the timing chart of FIG. 36 along line "centering jaws." Cam follower 288 is carried by arm 289 in cam track 287a to move arm 289 about its bearing on shaft 204. The outer end of arm 289 is pivoted to adjustable link 291 while the other end of link 291 is pivoted to bell crank 292. Bell crank 292 is pivoted at 293 on a center member of frame 197. Link 294 extends from bell crank 292 to extension arm 286a on shifter arm 286 while link 296 extends from extension arm 286a to extension arm 284a on shifter 284.

Associated with the centering arms 212 is a lock 297 which wedges against the upper finger 246 after the jaws have closed around an apple. This prevents the jaws from opening while they are pushing the apple downward into the seed celling station on the spindle and, combined with the cell centering feature of the centering jaws, ensures that the center of the apple is held in the median plane between the jaws.

Figure 29:
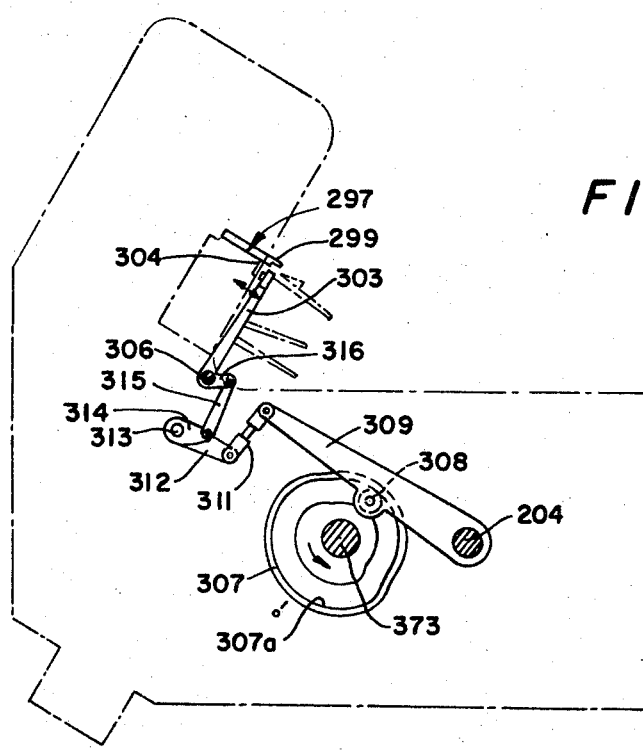

A wedge-shaped extension 298 (FIG. 12) is carried at the top of the upper finger 246 which is engaged by sliding lock plate 299. Plate 299 is slidably carried between channel member 218 and bracket 301 and is biased by spring 302 (FIG. 13) into engagement with wedge-shaped extension 298 to wedge thereagainst and prevent the finger 246 from moving upward after it has been positioned on top of an apple. To release the lock and allow the jaws to open, a release arm 303 is pushed against pin 304 on plate 299 to move the plate to the left as shown in phantom line position in FIG. 13. Release arm 303 (as shown in FIG. 29) is carried on rocker shaft 306 and is moved into engagement with pin 304 by cam 307 mounted on shaft 373 and in timed sequence as defined by line "jaw lock" in FIG. 36. Cam follower 308 rides in cam track 307a and swings arm 309 about its bearing on shaft 204 to move link 311 at the outer end of arm 309. Link 311 rotates arm 312 to swing shaft 313 and arm 314. Arm 314 is pivotally connected by link 315 to arm 316 which forms a bell crank with release arm 303 about rocker shaft 306.

Figure 20:
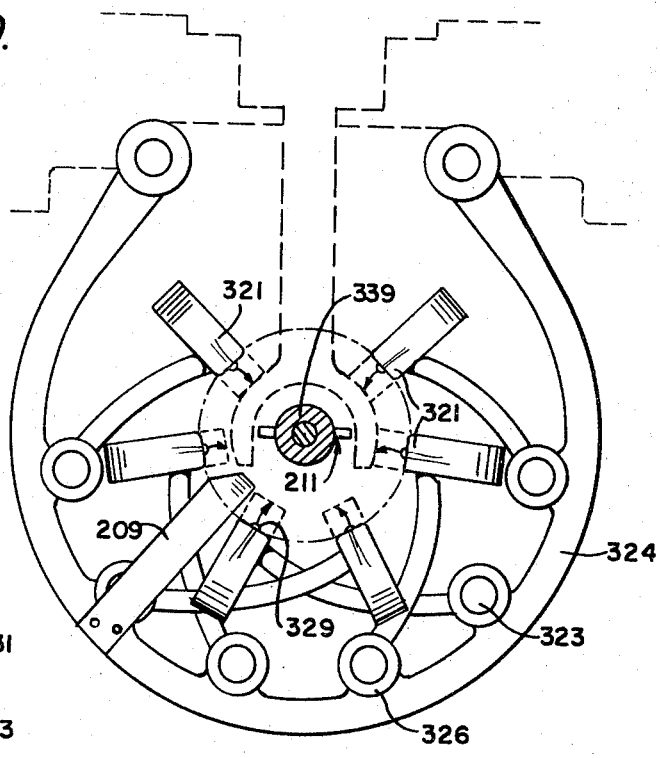
FIGS. 20, 21 and 22 are, respectively, sections taken along the lines 20—20, 21—21 and 22—22 in FIG. 18.
Figure 21:
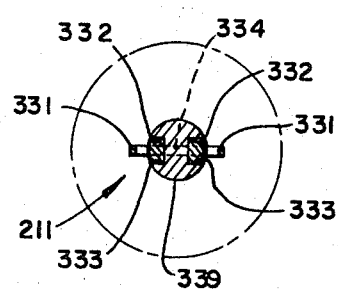

With the centering jaws closed and locked around an apple, the translator carriage is moved downward and pushes an apple into the area of seed celling knife. The spindle 192 tapers at 317 to an increased diameter matching the core hole of the apple and the seed cell knife extends radially therefrom. Around the seed cell knife 211 are a series of spring loaded arms 321 which press against the outer surface of the apple. These arms, as seen in FIGS. 18 and 20, have bearings 322 supported on posts 323 carried on a crescent-shaped frame 324 attached to Z-shaped frame 193. Posts 323 carry collars 326 at their upper ends which adjustably anchors the ends of torsion springs 327 against the arms 321 to bias the arms inward around the spindle. The arms are coextensive with the spindle around the seed celling knife at the seed celling station and taper outwardly at their upper ends 328 to allow an apple to swing them clear as the apple moves downward. The inner surface of each of the arms includes a longitudinal ridge 329 which grips the outer surface of the apple and holds it against the torque produced by the rotation of the seed celling knife in the apple.

Seed celling knife 211 is formed from two overlapping loop-shaped blades 331 carried on opposite sides of the spindle (FIG. 18). The blades are formed with a semicircular profile and are positioned such that they each cut away approximately two-thirds of the seed cell cavity when the spindle is rotated. The blades are mounted in replaceable blocks 332 carried in sockets 333 on the spindle by screws 334.

Figure 25:
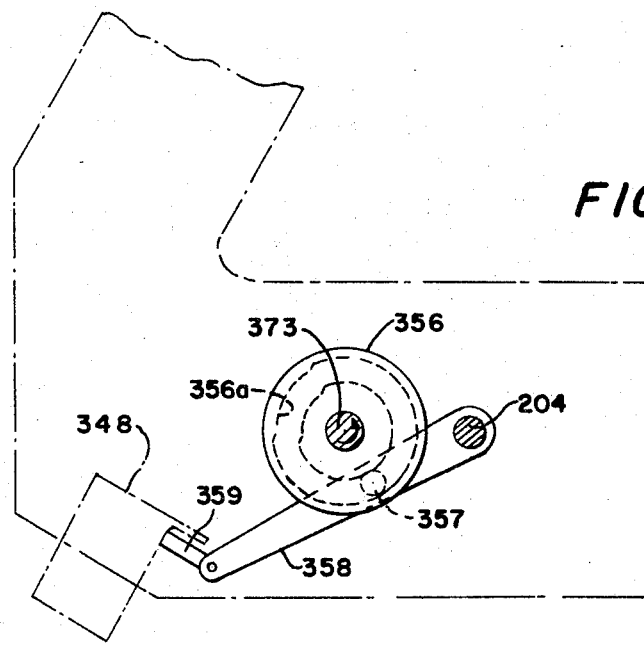
FIGS. 25, 26, 27, 28 and 29 are, respectively, taken along the lines 25—25, 26—26, 27—27, 28—28 and 29—29 in FIG. 23 showing various operating mechanisms.

To rotate the knife and cut away the seeds and surrounding fibrous carpel material from the center of the apple, the spindle and associated knife are rotated at least one revolution after the apple is in place. The spindle is carried at its lower end in bearing housing 336 attached to Z-frame 193 by fasteners 337. Spaced ball bearings 338 support the spindle shaft 339 while seal 341 isolates the bearings from the environment. Chain sprocket 342 is carried at the lowermost end of each of the spindle shafts and is entrained and driven by drive chain 343 (FIG. 23). One of the spindle shafts also includes a pulley 344 driven by belt 346 from pulley 347 on clutch 348. Clutch 348 is carried on frame 197 and is in turn driven through pulley 349, belt 351 and pulley 352 from motor 353. The clutch is engaged to rotate the spindle and knife by cam 356 mounted on shaft 373 only when an apple is in proper position as defined in FIG. 36 by line "seed cell knife clutch." As shown in FIG. 25, cam follower 357 is carried by arm 358 in cam track 356a and acts to swing arms 358 around its bearing on shaft 204. Arm 358 has clutch shifter link 359 pivoted at its outer end to engage and disengage the clutch.

Figure 22:
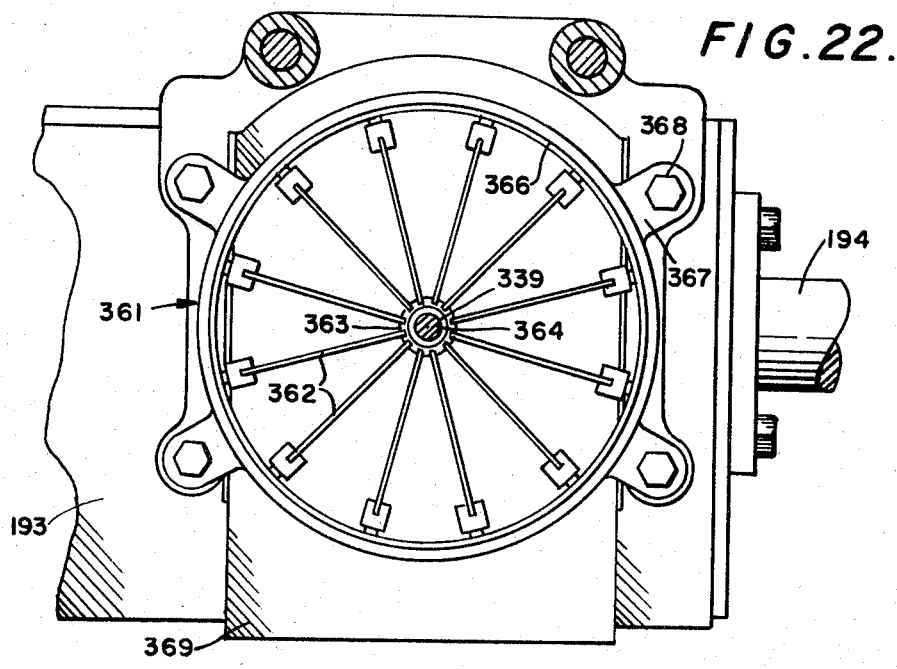

After the apple has had its seed cell removed by the knife, it is displaced along the spindle by fixed finger 217 on the next downstroke of the translator carriage. Carried on Z-plate 193 below the knife station is a set of slicing knives 361. This set is in the path of the displaced apple and serves to slice it along its axis. As shown in FIGS. 18 and 22, the set is formed from the series of knife blades 362 extending radially from an inner ring 363 supporting bearing 364 for spindle 339 to an outer ring 366. The outer ring is secured to a support bracket 367 on Z-frame 193 by bolts 368. Bracket 367 also carries the side walls of a discharge chute 369. Various knife configurations may be provided to slice the apple into either orangeslice-like segments or to cut the apple in half. Similarly, spindle shaft 339 is formed in three sections joined by threaded connections 371 and 372 and may be disassembled and changed to accommodate apples with different sizes of cored holes.

Figure 30:
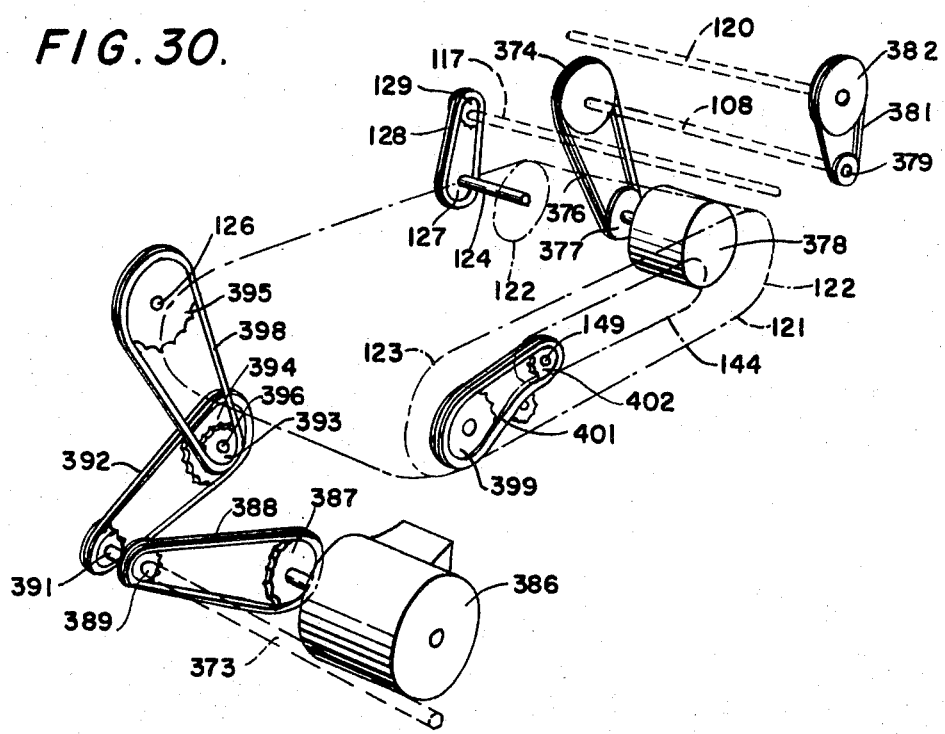
FIG. 30 is a perspective view showing the various drive mechanisms.
Figure 31:
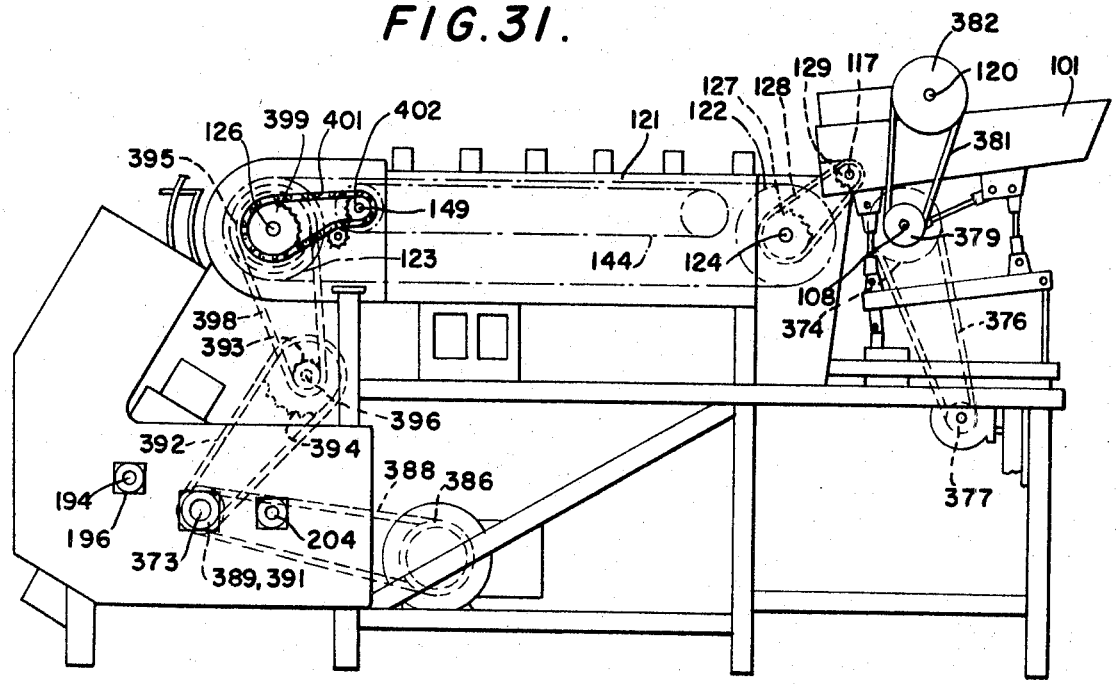
FIG. 31 is a side elevation of the machine also showing various of the drive mechanisms employed.

The drives of the various parts of the machine are illustrated in FIGS. 30 and 31. As shown, after the initial shuttling of the apples at the forward end of the machine, the drives are interrelated to synchronize the actions of the discharge chute, the orienting conveyor and cam shaft 373. At the input end, the eccentric shaft 108 is rotated by pulley 374 and belt 376 by pulley 377 on motor 378. Shaft 108 also carries pulley 379 which drives belt 381 and pulley 382 attached to rubber paddle shaft 120. In the synchronized part of the machine, gear motor 386 drives sprocket 387 and chain 388 to turn sprocket 389 on cam shaft 373. Cam shaft 373 carries cams 201, 224, 238, 287, 301 and 356 and rotates them simultaneously. Cam shaft 373 also carries sprocket 391 which drives chain 392 and sprockets 393 and 394 on shaft 396 which drives sprocket 395 attached to shaft 126 by means of chain 398 to drive sprocket 123 on conveyor shaft 126 and chains 121. Conveyor shaft 126 also carries sprocket 399 to drive chain 401 and sprocket 402 on orientor wheel shaft 149.

In operation, as is shown in FIGS. 4 and 5, the apples are dumped into bin 101 where they are shuttled into troughs 112. Paddle wheels 110 prevent the apples from doubling up at the end of the trough so that only a single apple is presented to the feeding wheels 116. The feeding wheel 116 picks up an apple and deposits it onto the conveyor 119 in timed relation to the passing of cups 118. As the conveyor progresses along, the apples in the cups are acted upon by the eccentric orientor wheel 152. The eccentric wheel engages the outer surface of the apple and rotates it until the cored hole is in an aligned position over an eccentric wheel. Also along the path of the conveyor, the apples are assisted in being centered in the conveyor cups by fingers 154 and 153, which ensures that the apple is oriented with the cored hole perpendicular to the conveyor. At the end of the conveyor 119 pin 142 enters a cup and either enters the core hole of a properly oriented apple or displaced any misoriented apples out of a cup. As the apples move around the end of conveyor 119, they are held on pins 142 by plate 183 as they come into alignment with pin 192 of spindle assembly 191.

Figure 32:
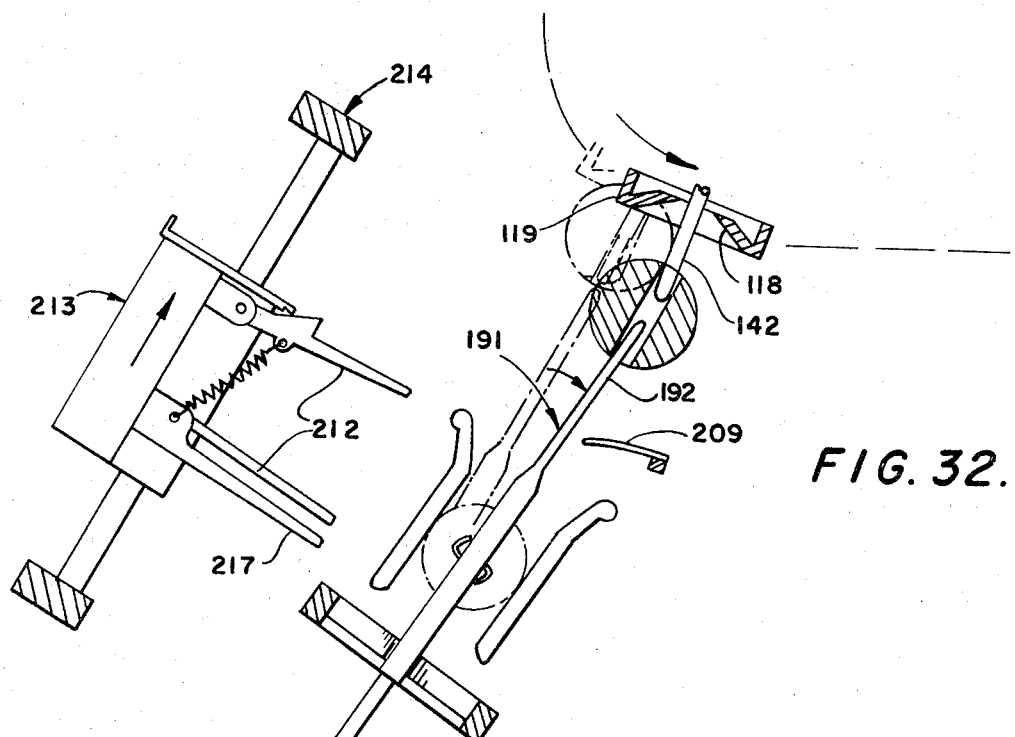
FIG. 32 is a side elevation partly in section showing the transfer of the apple on the centering pin to the pin forming a part of the seed celling mechanism.
Figure 33:
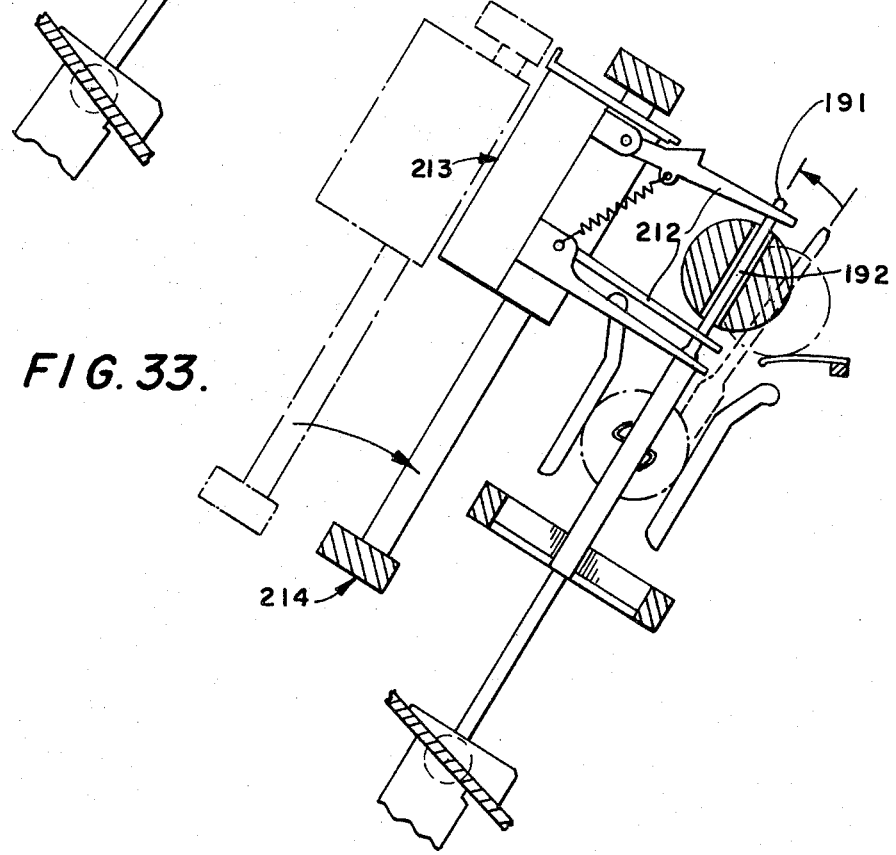
FIG. 33 is a view similar to FIG. 32 showing an apple ready to be centered and moved downwardly toward engagement with the seed celling mechanism, the preceding apple being shown in position on the seed celling mechanism and engaged by the gripping jaws to be held against rotation during seed celling.

At the end of curved plate 183, the apples are free to fall from pin 142 onto pin 192 while the two pins track each other for a short distance (see FIG. 32). During this time, translator carriage 213 is returning upward with the parallel ways 214 retracted to hold the fingers away from the spindle assembly. With the apple entirely on pin 192 and resting against leaf spring 209, the spindle assembly 191 retracts to its first position (see FIG. 33). At the same time, the parallel ways 214 a move carriage 213 toward the spindle assembly to bring the open centering jaws 212 into position above and below the apple.

Figure 34:
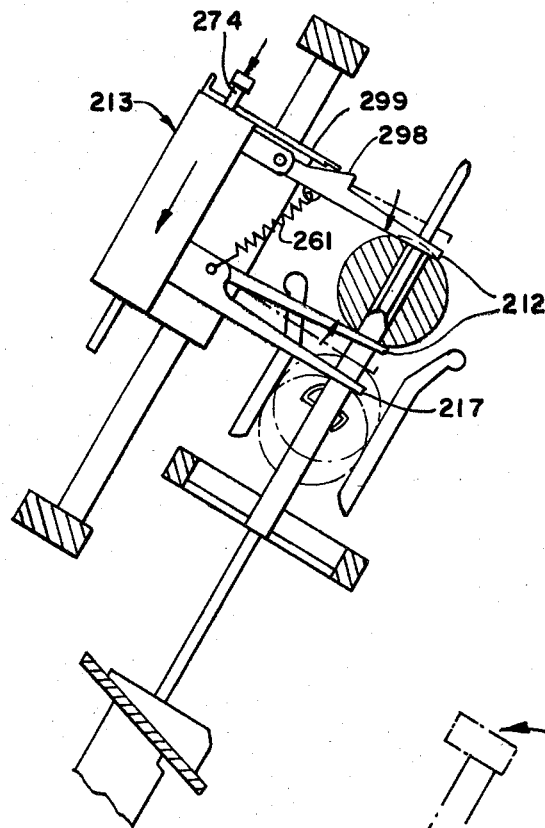
FIG. 34 is a view similar to FIGS. 32 and 33 showing the advance of the apple and the partial discharge of the preceding apple from the seed celling spindle.
Figure 35:
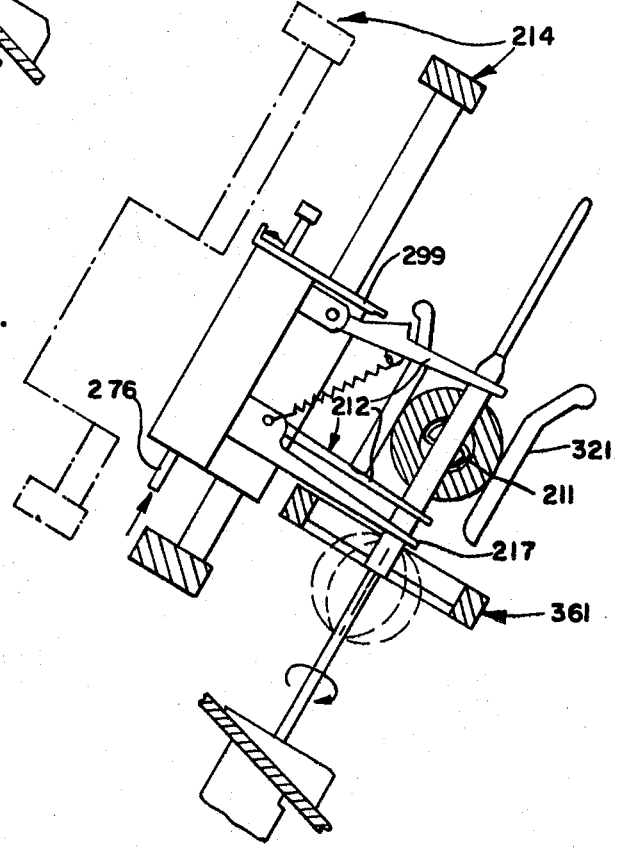
FIG. 35 shows the fully cut condition of the previously seed celled apple with the succeeding apple being seed celled.

Shifting shaft 274 is depressed against toggle 266 to cause the centering jaws to close around the apple under spring 261 (see FIG. 34). As the upper finger closes, locking plate 299 slides along wedge 298 and prevents the finger from opening. Since the fingers are tied together by equalizing link 253, the center of the apple is located and the apple is held positively. At this time, the translator carriage starts its downward movement. As the carriage moves the apple along the spindle, spring-loaded arms 321 are engaged by the apple to hold the apple securely at the seed celling station. With the apple centered on the seed celling knife 211, locking plate 299 is retracted and the centering jaws 212 are opened by shifting shaft 276. Clutch 248 is now engaged to rotate knife 211 and cut a spherical cavity in the center of the apple to remove the seeds and surrounding fibrous carpel material. During the downstroke of the translator carriage 213, lower fixed finger 217 has engaged the top of the previously seed celled apple and has displaced it through the slicing set of knives 361.

I claim:

1. In an apparatus for removing the seed cell from a previously cored apple including:
    a. a conveyor having a plurality of cavities therein, each cavity being conical in shape and having an opening on the underside,
    b. the conveyor being movable over a path having upper and lower horizontal runs connected by a semicircular run at each end,
    c. a rotatable support provided within one of the semicircular runs of the conveyor,
    d. a plurality of first pins slidably mounted on the rotatable support and extending radially from the support,
    e. means for moving each of the first pins first to project into the opening in a cavity on the conveyor and then to extend into the core hole in an apple in said cavity and finally to be withdrawn from said core hole and the cavity after the apple has fallen down the first pin,
    f. a curved plate having a curvature on a radius extending from the center of one of the semicircular runs of the conveyor to engage and support an apple on a first pin as the pin approaches a transfer point at the lower end of the semicircular run,
    g. and a second pin movable over a path to follow the first pin at said transfer point to enter the core hole in an apple on the first pin and engage the apple as the apple falls down the first pin after which the first pin is withdrawn from the apple.

2. In an apparatus for removing the seed cell in an apple as in claim 1 including means for moving an apple on the second pin downwardly and into engagement with means positioned below the second pin for engaging the sides of the core hole in the apple.

3. In an apparatus for removing the seed cell from a previously cored apple including:
    a. a conveyor having a plurality of cavities therein, each cavity being conical in shape and having an opening on the underside,
    b. the conveyor being movable over a path having upper and lower horizontal runs connected by a semi-circular run at each end,
    c. a rotatable wheel provided beneath each cavity to engage an apple therein to orient the apple with its core hole in a vertical position,
    d. a rotatable support provided within one of the semi-circular runs of the conveyor,
    e. a plurality of pins slidably mounted on the rotatable support and extending radially from the support,
    f. and means for moving each of the pins first to project into the opening in a cavity on the conveyor and then to extend into the core hole in an apple in said cavity to maintain the orientation of the apple in the cavity.

4. In an apparatus as in claim 3, a curved plate having a curvature on a radius extending from the center of one of the semi-circular runs of the conveyor to engage and support an apple on a pin as the pin approaches a transfer point at the lower end of the semi-circular run.

5. In an apparatus as in claim 4, a plurality of other pins movable over a path such that each of the other pins follows one of the aforementioned pins at said transfer point to enter the core hole in an apple and engage the apple as the apple falls free from the aforementioned pin and as the aforementioned pin is withdrawn from the apple.

* * * * *